United States Patent [19]

Fenwick

[11] Patent Number: 4,704,703
[45] Date of Patent: Nov. 3, 1987

[54] DYNAMIC INPUT PROCESSING SYSTEM
[75] Inventor: David Fenwick, Portland, Oreg.
[73] Assignee: Airus Incorporated, Portland, Oreg.
[21] Appl. No.: 757,263
[22] Filed: Jul. 22, 1985
[51] Int. Cl.4 ............................................... G06F 3/00
[52] U.S. Cl. ................................................... 364/900
[58] Field of Search ... 364/200 MS File, 900 MS File
[56] References Cited

U.S. PATENT DOCUMENTS 4,468,728 8/1984 Wang .................................. 364/200
4,611,298 9/1986 Schuldt .............................. 364/900

Primary Examiner—Raulfe B. Zache
Attorney, Agent, or Firm—Stoel Rives Boley Jones & Grey

[57] ABSTRACT

A data item input processor operates on the smallest subdivision of data as it is entered into a data processing system to provide control and/or error functions nearly simultaneously with the entry of each such data item. As each item is entered a tree logic search is conducted within a stored data base to determine if the entered item is permissible, that is, whether it completes an allowable sequence of data items. If the item cannot be found a signal is provided which may be used to initiate any function desired by the user.

15 Claims, 6 Drawing Figures

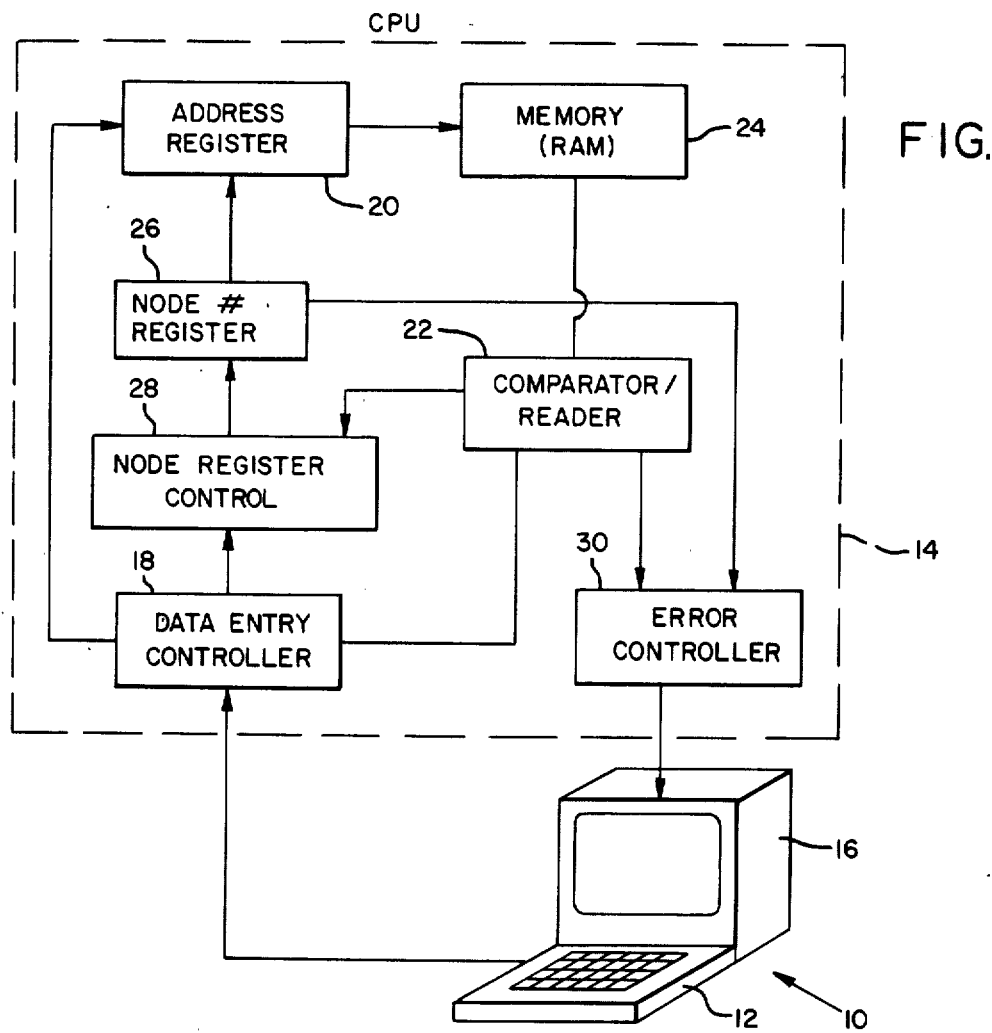
FIG. 1
FIG. 2A
| ADDRESS | MEMORY |
|---|---|
| 0 | θ |
| 1 | -1 |
| 2 | 3 |
| 3 | a |
| 4 | -1 |
| 5 | 6 |
| 6 | t |
| 7 | 12 |
| 8 | 9 |
| 9 | b |
| 10 | -1 |
| 11 | -1 |
| 12 | m |
| 13 | -1 |
| 14 | 15 |
| 15 | b |
| 16 | -1 |
| 17 | -1 |
| 18 | |
FIG. 2B
| ADDRESS | NODE DESIGNATION |
|---|---|
| n | DATA |
| n+1 | RIGHT POINTER |
| n+2 | LEFT POINTER |
FIG. 2C
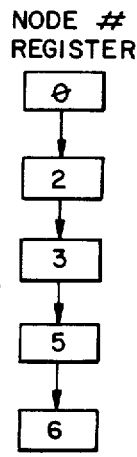

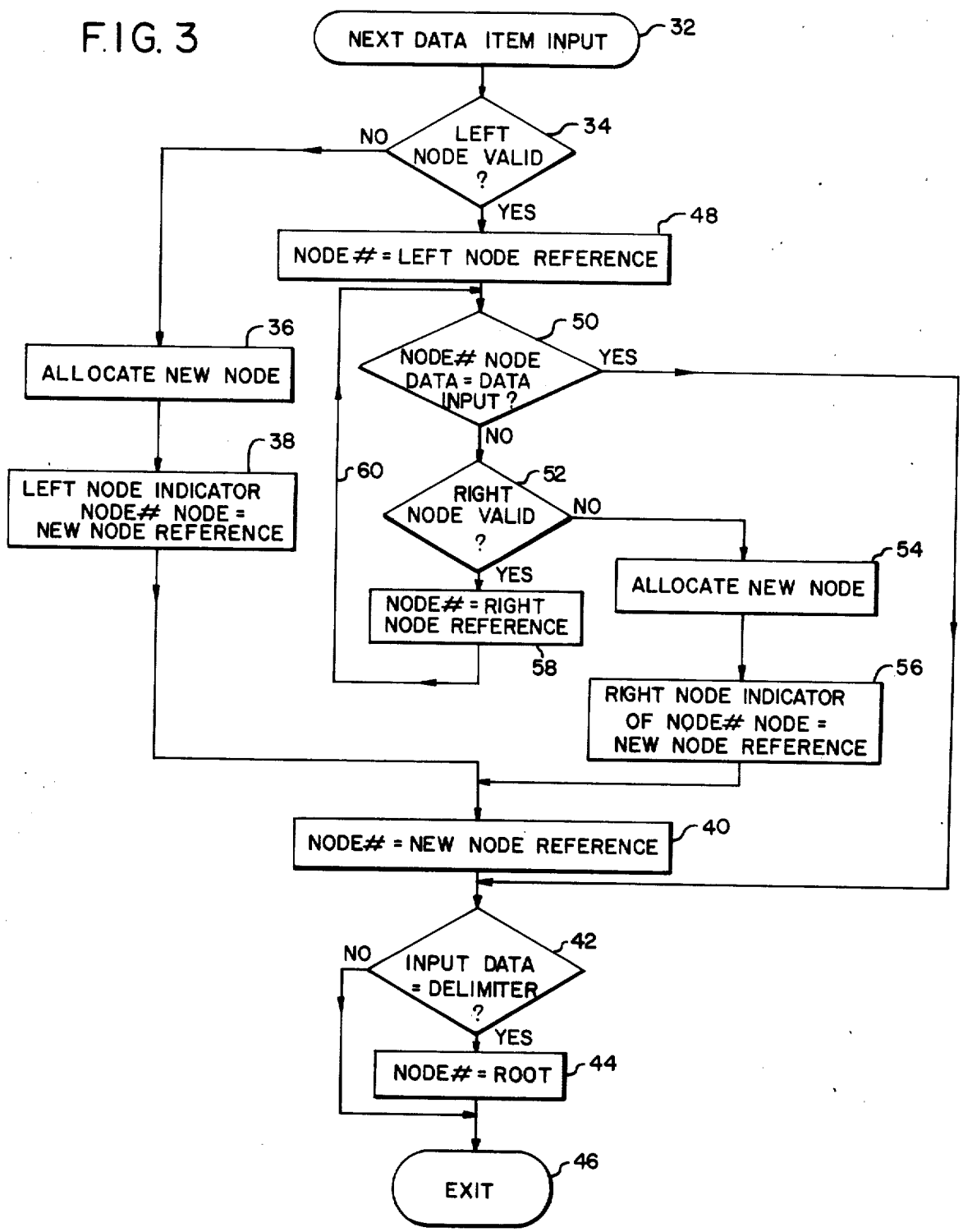

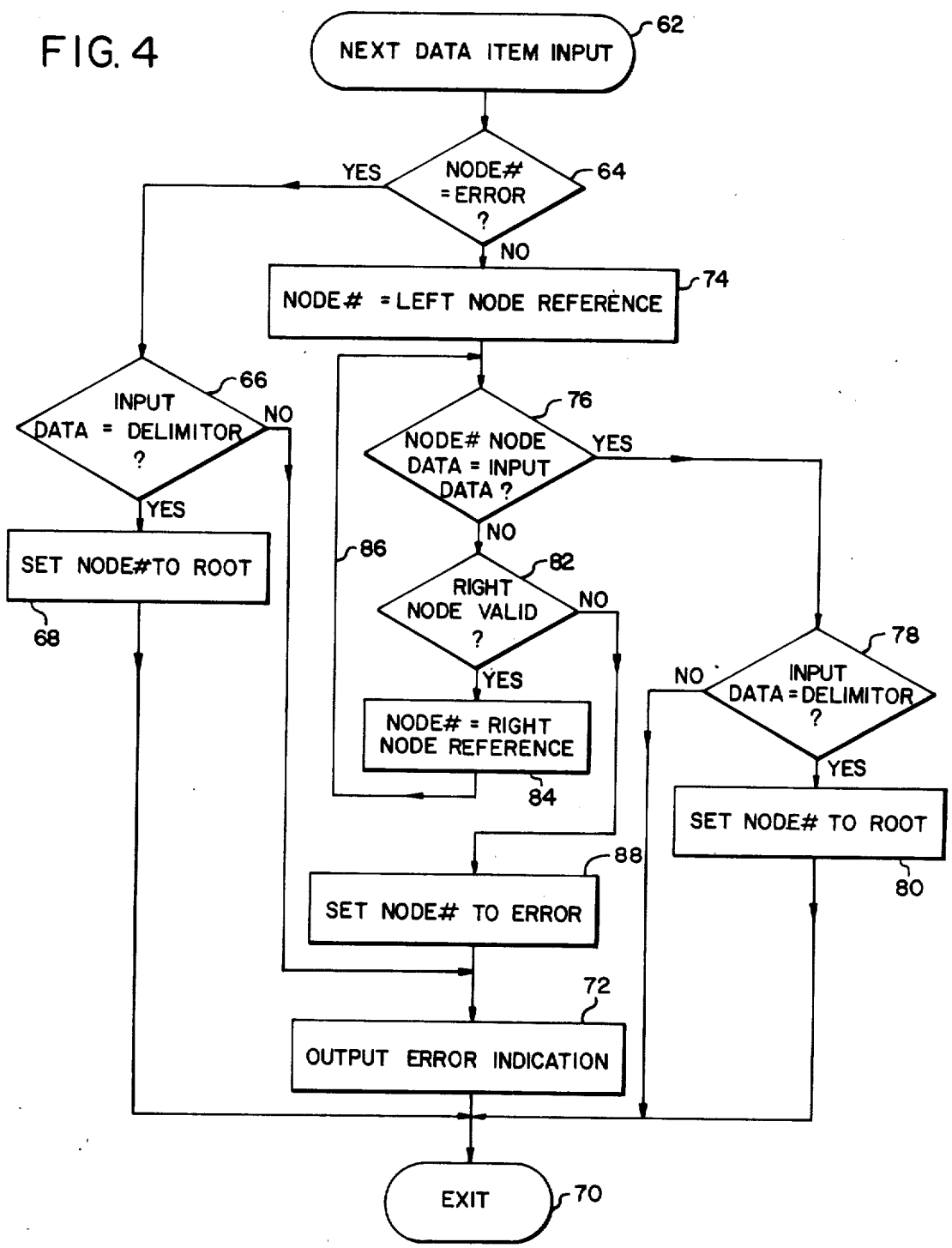

DYNAMIC INPUT PROCESSING SYSTEM

BACKGROUND OF THE INVENTION

The present invention relates to a method and apparatus for the processing of data as it is entered into a data processing system.

Conventional data processing systems such as microcomputers utilize computer programs which manipulate components of the system to perform various tasks. Programs requiring input data to be entered expect this data to correspond to a particular format unique to the program. Processing of the data does not take place until an indication is made to the program that the format is complete. Usually this indication is the occurrence of a carriage return in the input data stream. Not until this indicator is reached does the program process the data and take some course of action.

In the entering of such data, whether the entry comprises data to be entered or commands to be executed, the user may make mistakes and enter the wrong commands or may enter data incorrectly. In such cases some programs provide a "syntax error" message that flashes on the screen. This message usually appears as the result of an incorrect command or data word being entered and the carriage return key having been pressed. As a result of the syntax error message the user knows that something is wrong but cannot determine at what point in the entry of the data word or command the error occurred.

In certain types of programs such as in word processing programs a dictionary may be stored in a memory portion of the system such as a random access memory. The system may then be programmed to accept only words that correspond to words in the dictionary. When an incorrect word is entered an error message may flash once the complete word has been entered, indicating an error somewhere in the word. The user, however, cannot determine where the error lies, but only that the error lies somewhere in the data word just entered.

A desirable feature in both of the above applications and in any other data input application would be the ability to determine exactly where an error lies at nearly the precise moment of entry of an erroneous data character within a word or command. Most data processing systems are accessed through a keyboard in which alpha-numeric commands and/or data items are entered one character at a time in sequential fashion. Moreover, the display screens of typical data processing systems of this type provides a visual indication of data entry simultaneous with the physical entry, that is, as items are typed on the keyboard they begin to appear on the screen substantially simultaneously with the strike of each key. If some of the processing could be done as each item of data were entered into the system, even though the complete data word or command of which the item is a part were incomplete, then the program would have less processing to do at the end of the word or command. The smaller the items of input data that can be processed, the more the processing can be spread out over the total data entry time, and the faster the processing will appear. Therefore, in order to obtain the greatest apparent increased in processing speed, the processing should take place the instant the smallest piece of usable data is available to the program. This will usually be an alpha-numeric character or punctuation symbol. By way of illustration it would be desirable to provide syntax or spelling error checking which would alert a user that an error has occurred at nearly the precise moment that an erroneous data item, for example, an alpha-numeric character, is entered. In this way the user would know precisely where in the data word or command the error has occurred.

SUMMARY OF THE INVENTION

The present invention provides a method and apparatus for the processing of data simultaneously with its entry into the data processing system by arranging the data items to be used in the particular format of the program in a logical sequence so that for each data item entered the data base may be searched to determine if the entry of a particular item in a particular position matches a data word or data command stored in the dictionary. If no such match can be found, the system provides a signal which may be used for any purpose, such as a control function or to indicate that an error has been made.

In order to provide this feature in, for example, a word processing system, each allowable data word is entered into a dictionary a character at a time. Each character occupies a particular address location in a memory. A node which is a field of address locations is also allocated to each data character as it is entered. Each such node includes a data character address location and left and right address locations which function as pointers. These pointers point to the next node which includes the next allowable data word character, or if none, points to an address location which contains an error indicator. A blank space or "delimiter" which occurs at the end of a data word is treated in the same way as a data word character. Thus, each data word occupies a unique set of locations in the address register stored in memory. Once the data base is constructed in this fashion a character entered at the keyboard progresses serially through the address register according to a tree logic search pattern until a permissable address location for the character is established, or until an error indication is reached. In the latter case an error message will flash on the screen highlighting the erroneously entered data word character.

All data word characters in each position in a word, that is, whether the characters are the first character in the word, second character, or third character include one or more pointers which point to a set of nodes which contain the next permissable characters in the word. The system also includes a node number register that maintains the current position of the tree logic search within the address register as the register is searched. This insures that as each sequential data node is searched the node number register updates the position for the address location within the address register where the last logical search operation was executed could also contain the next place to search. Thus, for each data word entered the last node containing permissible data will be the first node searched for the next character entry, and a unique set of address locations will be searched for each data word.

It is a principal object of this invention to provide an input processing system for processing data wherein a signal may be provided indicating the existence of a non-matching item in a data word almost simultaneously with the entry of that data item into the system.

A further object of this invention is to provide an input processing system which may be used with any data processing system which includes a dictionary of permissible terms which processes data as it is being entered.

Yet a further object of this invention is the provision of an error checking feature for a word processing system which provides a perceptible signal nearly simultaneously with the entry of a data character that indicates if a mistake has been made in the entry of the character.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 1 is a block diagram of an error checking system comprising the present invention.

FIG. 2(a) is a schematic representation of a data base containing a dictionary comprising the words "AT" and "AM."

FIG. 2(b) is a schematic representation of a typical node designation in the data base of FIG. 2(a).

FIG. 2(c) is a schematic representation of a node number register illustrating the progressive designation of address locations according to a tree logic search for the input of the word "AT."

FIG. 3 is a flow chart diagram depicting the method of constructing the data base of FIG. 2(a).

FIG. 4 is a flow chart diagram depicting the method of conducting a tree logic search in the data base of FIG. 2(a) upon entry of each data character.

DETAILED DESCRIPTION OF THE INVENTION

A data processing system 10 includes a mechanical data entry device such as a keyboard 12 for inputting alpha-numeric characters into an error checking network 14. The network 14 is shown in dashed lines schematically in FIG. 1; however, it is physically incorporated into the housing which includes the data entry keyboard 12. The data processing system 10 also includes a display screen 16 which may be, for example, a cathode ray tube (CRT).

The network 14 includes a data entry controller 18 which controls the operation of the remaining components of network 14. Data entry controller 18 also routes entered data words to a reader/comparator 22. The address register 20 accesses a memory unit 24 which may be, for example, a random access memory (RAM). Locations in the address register 20 are controlled in the present system by a node number register 26 which is responsive to a node register control 28. The node register control 28 obtains its instructions from the reader/comparator 22 or the data entry controller 18. Both the node number register 26 and the reader/comparator 22 provide outputs to an error controller 30 which may provide a visual indication on display device 16 that an error in the entry of a character of a data word has occurred.

FIG. 2(a) illustrates a data base which contains a dictionary constructed according to the present invention which contains the words "AT" and "AM." The method of constructing the data base illustrated in FIG. 2(a) is shown in FIG. 3. At block 32 in FIG. 3 a data item, which is usually a alpha-numeric character typed in from the keyboard 12, is entered into the data processing system 10. In block 34 it is determined whether the left pointer of the current node number contained in the node number register 26 is valid. A node, which is illustrated in FIG. 2(b), consists of three address locations in memory 24 as indicated by the address register 20. For any node #N, the address locations in memory are N, N+1, and N+2. These locations contain a data item, a right pointer, and a left pointer, respectively. For example, if the letter "A" is entered in block 32 and the current node number indicated by the node number register 26 is 0 or a "root" the left pointer of the node beginning with address location 0 will not be "valid" because it will contain no data. That is, upon initiating the construction of a data base, all of the locations in random access memory 24 are vacant or unfilled. The reader/comparator 22 is instructed by data entry controller 18 to interpret a vacant memory location as an error condition which is symbolized in FIG. 2(a) by the alpha-numeric character "−1." Thus, upon entry of the letter A the left node will not be valid and the instruction contained in block 36 will be executed. The instruction in block 36 is to allocate a new node, and includes the function of placing the entered data item in the node #N at address location N. When a new node is allocated as indicated at block 36 the allocation begins at the next sequential address in the address register from the left or right pointer just queried. Next, the CPU executes the instruction in block 38. The instruction in block 38 makes the left node indicator of the current node number refer to the new node that has just been allocated. This means that in the example of FIG. 2(a) at address location 2 there will be stored as data a number indicating address location 3. Thus, the left pointer (address 2) of the beginning node number (address 0) is now valid and points to address 3. Once the instruction in block 38 has been completed an instruction in block 40 is completed. This instruction updates the node number register 26, changing it to the new reference node allocated in block 36. The node number register 26 at this point contains address location 3. Next it is determined in block 42 if the input data character is a delimiter. A delimiter is defined as a blank space or any symbol that indicates the end of a data word. Since the current example is to illustrate the construction of a dictionary containing the words "AT" and "AM" it will be assumed that the input character A is not a delimiter. In such a case instruction block 44 is skipped and the system is exited at block 46. In the event that a delimiter has been entered, block 44 will be executed which instructs the node register control 28 to change the node number register 26 to the root address location. In the present example the root address location is address 0.

As the next data item is entered at block 32 the program illustrated by the flow chart in FIG. 3 will be repeated. However, this time the flow chart will not be constructing the dictionary beginning at the root node number. This is because the current node number as contained in the node number register 26 has been set to address location 3 in accordance with the previous instruction from block 40. Thus, if the letter T comprises the next data item input, the answer to the query in block 34 will again be no. Block 36 will cause the address register 20 to allocate a new node and block 38 will cause the left pointer of the current node number in the node number register 26, which is node number 3, to indicate or point to the new node of reference which was allocated in block 36. Since node numbers are allocated sequentially in groups of three, the new node begins at address location 6. As the new node was allocated beginning with address location 6 the data which consisted of the letter T was placed in memory at address location 6 as instructed by block 36. Since the letter T is not a delimiter the program exits at block 46.

At the end of a word a delimiter must be added to indicate that the word has ended. When a delimiter is added in block 32 the sequence described for the entry of the letters A and T will be repeated and as a result a new node will be allocated beginning with address location 9 which will contain the delimiter as shown in FIG. 2(a). This time, however, at block 42 the answer to the query as to whether the input data character is a delimiter will be answered in the affirmative in which case the command at block 44 will be executed returning the node number in the node number register to the root node, in this case 0.

At this point in the example illustrated, the word "AT" has been loaded into the dictionary. The following discussion will illustrate the method by which a second word also beginning with the letter A is loaded into the dictionary. Assume that the word is "AM." When the first letter of the new word to be entered in the dictionary is entered at block 32, the answer to the query in block 34 is "yes." This is because the left pointer of the current node number, address location 2, contains data. The data that it contains is the identity of an address location. In this case block 48 causes the node number register 26 to go to the address location indicated by the left pointer, address location 2. Thus, the node number register 26 now reads 3. In block 50 the reader/comparator 22 is queried so that it may compare the data at node number 3 with the input data character. The data at address location 3 is the letter A and the input data character is also the letter A. Thus the answer to the query in block 50 is "yes" and the program skips to block 42. Since the letter A is not a delimiter the exit command in block 46 is executed.

One word and a portion of another word have now been entered into the dictionary according to the example of FIG. 2(a). If a second letter of a second word is entered, for example, the letter M, the sequence which occurred for the entry of the letter A will be repeated. This time, however, the node number register reads node number 3. The left pointer of node 3 is valid so the command in block 48 is executed which makes the node number in the node number register equal to the address location indicated by the left pointer of node number 3. The left pointer of node number 3 is address location 5 which contains a data address location 6. Thus, address location 6 is loaded into the node number register 26 and the query in block 50 is executed. At address location 6 the data character entered, an M, does not equal the data character stored, a T. This causes the reader/comparator 22 to read the right pointer (address location 7) of the current number which is node number 6. The pointer is not valid because no data has yet been loaded into either of the left and right pointer addresses of node number 6. Thus, block 54 is executed which commands the node register control 28 to allocate a new node. The next available node begins with address location 12. This is because a delimiter occupies the node beginning in address location 9. Command block 56 requires that the node register control 28 cause the right pointer of the current node (address location 6) to indicate or point to the new node just allocated. Thus, address location 7 is loaded with data representing address location 12. Next command block 40 causes address location 12 to be shifted into the node number register 26. The letter M is not a delimiter so the result of the query in block 42 is an exit at block 46. When a delimiter is then entered after the end of the word "AM," the left pointer of node 12 (address location 14) will point to a newly allocated node which must begin at address location 15 to store the delimiter symbol. This sequence will be similar to that followed for the entry of the original letter A, that is, the path followed will be blocks 34, 36, 38, 40, 42, 44, and 46.

The result of the foregoing will be that address locations 0 through 17 in memory have been utilized to store the two data words "AT" and "AM" with delimiters following each. The entry of additional data words will be loaded in a similar manner. Block 58 will be utilized in the case of words beginning with the letters "AT" and "AM." For example, entry of the data word "ATE" will follow a logical sequence beginning at block 32 and ending at block 58. This is because for all words beginning with the letters "AT" there exist valid left and right pointers after the entry of the letter T. The loop at line 60 linking command block 58 and block 50 will be executed whenever both right and left pointers are valid, but since block 58 continually toggles the node number in the node number register 26 there will eventually be a right pointer which is not valid, and as a result of the query in block 52, block 54 will be executed to allocate a new address location for the next data character. The data base is therefore constructed as a logical tree in which each data character stored in memory includes two adjacent address locations which contain data that point to subsequent permissible characters located in the data base. Thus, for each word in the dictionary stored in the data base there exists a group of memory locations corresponding to a unique set of address locations which contain the sequence of characters corresponding to the entered data word.

When the dictionary has been loaded into the data base at the memory locations indicated by the address register, the system is ready to accept data words which may be entered by typing in data word characters one at a time in serial fashion. FIG. 4 illustrates how the error checking system operates as each character is entered. Each data item or character is entered beginning at block 62. As the data character is entered, for example, the letter A, the reader/comparator 22 first determines if the current address location in the node number register contains an error indication as indicated in block 64. If the address location of the node in node number register 26 contains an error message, the reader/comparator 22 determines at block 66 whether the data input is a delimiter or some other character. If the data input is a delimiter, a command is executed at block 68 to reset the node number register 26 to the root node. There upon the program is exited at block 70. If the input character is not a delimiter a command is executed in block 72 which causes the node register control 28 to set the node number register 26 to designate an error condition which, in turn, causes the error controller 30 to display an error condition on the display screen 16 adjacent to or surrounding the character just entered.

The error controller 30 could take a variety of forms, but the preferred form is that of a visually perceptible indication that the character just entered is an erroneous character. This may be done by highlighting the character just entered with a marking device such as a flashing underline or by shifting the condition of the screen pixels illuminating the character to the background level while brightening the immediately adjacent screen pixels, thus illustrating the character erroneously entered as a "negative." This provides an immediately perceptible indication to the user that the character just entered into the data processing system 10 is an impermissible character because no data word exists having the particular sequence of characters just completed by the entry of the last character.

If no error indication exists, however, upon the entry of a character, block 64 will be answered in the negative and the command in block 74 will be executed. Thus, the node number as indicated in the node register 26 will be toggled to the address of its left pointer and the data character entered at block 62 will be compared with the data in the address location indicated by the left pointer from block 74. The comparison takes place in block 76. Thus, for example, if the letter A was entered at block 62 and the node number register 26 is set to the root, the query in block 64 will lead to block 74 which will cause the node number register 26 to be set to address location 3. At address location 3, the entered data character A does match the data contained in the memory at address location 3. Thus, the query in block 78 will be undertaken by the reader/comparator 22 which will indicate that the letter A is not a delimiter. Had the entered character been a delimiter the command in block 80 would be executed which would reset the node number register 26 to the root node or 0.

With the node number register set at address location 3, assume that a T is entered at block 62. Block 64 will indicate that the memory location of the current node number is not an error and thus block 74 will be executed which will toggle the node number register 26 to the left pointer (address location 5) of the current node number (address location 3). Address location 5 contains address location 6 so that in block 76 the entered data item is compared with the data at address location 6. Since address location 6 contains T the answer to the query in block 76 is "yes" and the program is exited at block 70.

If an M had been entered instead of a T the answer to the query at block 76 would have been "no," however, the answer to the query at block 82 would have been "yes" whereupon the instruction at block 84 would have been executed by the node register controller 28. This would have toggled the node register 26 to node number 12 which does contain an M and a subsequent comparison of the entered data character with the contents of address location 12 would lead to a "yes" answer at block 76. Thus, either of the words "AT" or "AM" could be entered into the data processing system 10 without an error indication because the tree logic search, in conjunction with the method illustrated in FIG. 4, would lead to a match of the entered data characters with data characters in the dictionary arranged in the same permissible sequence.

The entry of the letter X, however, after the entry of the letter A, would lead to an error indication causing the X character illustrated on the screen to be highlighted thus indicating that the character was erroneously entered. In the case of an X entered after an A completion of the loop at line 86 would cause the node register 26 to be set at node 12, at which point the X would be compared with the character M at address location 12 in response to the query in block 76. X does not equal M and so the query in block 82 would then be executed. Since the node number register, however, had been shifted from node 6 to node 12 by the completion of the loop at line 86 a condition would arise where the right indicator of node 12 would not be valid (refer to FIG. 2(a)). This is because in the dictionary loaded into the data base the only permissible characters following the letter A are the characters T and M. Thus, the instruction in block 88 would be carried out and the output indication at block 72 would be executed.

After entering an erroneous data character it is necessary to delete the character from entry. This resets the node number register 26 to the value that it had prior the entry of the erroneous character. This is necessary to insure that the condition existing at block 64 exists only when an erroneous character has been entered. Thus, with the deletion of the character X the character A remains on the screen and the test for the next permissible character will be conducted at address location 6 which is indicated by the left pointer of node 3.

The present system thus provides a means for checking for the erroneous entry for characters in data words or commands that may be entered into a data processing system. As the foregoing example illustrates, the system is easily adaptable to word processing systems which may contain a dictionary of permissible terms which can be used. The system of the present invention, however, is not limited to word processing programs but may be utilized in general for any program for which sequences of data items are to be entered into a data processing system serially, that is, one item at a time. The system has application for any sequence of characters or commands in which errors may occur if commands or characters are entered in the wrong sequence or contains unallowable or misspelled data words.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A data processing system comprising:
   (a) entry means for entering data items into said data processing system one at a time in serial fashion;
   (b) search means connected to said entry means for conducting a tree logic search of the data items supplied by said entry means in a data base containing in a memory all permissible data items to be used in conjunction with said data processing system, wherein said search means is operative for performing said tree logic search on each data item as that item is entered into the data processing system and each of said permissible data items in said data base are stored in groups of uniquely interconnected sets of memory locations such that said tree logic search may be conducted in serial fashion through one or more of said sets for each entered data item; and
   (c) control means connected to said search means for providing a signal when, for any data item entered, the tree logic search conducted by said search means arrives at a memory location for which no corresponding permissible data item is stored.

2. The system of claim 1 wherein said signal provides an error indication perceptible by a user.

3. The system of claim 1 wherein said search means comprises an address register means containing addresses of memory locations for permissible groups of data items, error indicators and addresses of other memory locations where subsequent groups of data items are stored.

4. The system of claim 3 wherein said search means further comprises a node number register for designating three addresses in said address register as a node, said node number register indicating an address in the address register at which said tree logic search begins upon entry of a data item.

5. The system of claim 4 wherein said addresses in said address register are arranged in nodes containing three address locations such that a first address designates a location in memory to be compared with an entered data item and a second address and a third address comprise locations in memory for left and right pointers which contain error indicators or the addresses of memory locations containing subsequent permissible data items.

6. The system of claim 5 further including node register control means for shifting a current value of the node register to a new value as indicated by one of said left and right pointers, respectively, when an entered data item does not correspond to the memory location of a first address in the node.

7. The system of claim 6 wherein said node register control means shifts the current value of the node register to an error value when said search means addresses one of said left and right pointers and one of the pointers so addressed designates an address location in memory that contains an error indicator.

8. The system of claim 7 wherein said search means includes means for determining if an entered data item character is a delimiter and for resetting said node register to a beginning address if said delimiter follows a permissible group of data items.

9. A method of checking data items as they are entered into a data processing system to determine if a data item is a permissible item in a permissible group of data items comprising the steps of:
   (a) constructing a data base of groups of permissible data items wherein said permissible items occupy unique sets of memory address locations within said datas base;
   (b) performing a tree logic search on each entered data item as that item is entered to determine if said item can be found in said data base within one of said unique sets; and
   (c) providing a signal when, for an entered data item, it is determined that no such item can be found.

10. The method of claim 9 wherein the step of constructing said data base includes the substeps of: allocating memory address locations to an address register in nodes such that each node comprises three addresses including a data address, a left pointer and a right pointer, respectively, and entering permissible data items into said data base such that for each permissible data item at a data address location of a node, either of the left pointer and right pointer contain address locations in memory which contain a next permissible data item or contain an error indicator if a next data item does not exist.

11. The method of claim 10 wherein said step of performing a tree logic search includes the substeps of: designating a node number in a node register at which the tree logic search is commenced for each entered data item and shifting the node number in the node register to correspond to each node searched in the tree logic search.

12. The method of claim 11 wherein said step of performing a tree logic search includes the substep of: shifting the node number in the node register to an error value when an address location searched by the tree logic search contains an error indicator.

13. The method of claim 9 wherein said step of providing a signal includes the substep of: visually designating on a display screen that an error has occurred.

14. The method of claim 12 wherein said step of providing a signal is undertaken only when the value of the node register is shifted to an error condition.

15. The method of claim 13 wherein said substep of visually designating an error on a display screen includes the substep of: illuminating the dark background immediately adjacent to the erroneously entered data item.

* * * * *

UNITED STATES PATENT AND TRADEMARK OFFICE
CERTIFICATE OF CORRECTION

PATENT NO. : 4,704,703

DATED : November 3, 1987

INVENTOR(S) : David Fenwick

It is certified that error appears in the above-identified patent and that said Letters Patent is hereby corrected as shown below:

In column 1, line 51, "provides" should be --provide--; line 64, "increased" should be --increase--.

In column 2, lines 40 and 49, "permissable" should be --permissible--.

In column 3, line 66, "a alpha-numeric" should be --an alpha-numeric--.

In column 5, line 53, "reader/-" should be --reader/--.

In column 6, line 54, "There upon" should be --Thereupon--.

In column 8, line 9, "prior" should be --prior to--; line 31, "contains" should be --contain--.

In claim 1, column 8, line 41, "system" should be --system,--.

In claim 9, column 9, line 42, "datas" should be --data--.

Signed and Sealed this

Fourteenth Day of June, 1988

Attest:

DONALD J. QUIGG

*Attesting Officer*      *Commissioner of Patents and Trademarks*